(12) United States Patent
Honey

(10) Patent No.: X4024
(45) Date of Patent: Feb. 10, 1825

(54) SHOT, SCREENING TABLE

(76) Inventor: John W. Honey

John W. Honey.
Letters Patent.

The Schedule referred to in these Letters Patent and making part of the same containing a
description in the words of the said John W. Honey himself of his improvement in
screening Tables for discriminating, detecting and separating perfect from imperfect Shot.

These Tables may consist of any number not less than two. may be made of wood with
smooth surfaces and having perpendicular sides or casings fastened so as to close tight to
the edges lengthwise, and sufficiently elevated to prevent the shot from rebounding over:
They may be of any length, though exceeding twelve feet is deemed not necessary, the breadth
should be in proportion to the quantity of shot it is intended to screen per hour. that is
to say if intended to screen or separate five hundred pounds per hour. the first table
should be at least eighteen inches in breadth. each succeeding table increasing so as
to admit the end of the Table above it, together with its sliding inclined plane between
the sides or casings. The ends of the tables (except the upper end of the first one) are kept
open to admit a free passage for the shot from one table to another unless the tables are
placed in reversed order in which case the upper ends of the reversed tables are closed
up sufficiently high to prevent the shot from rebounding over. They are fixed in an
oblong square frame of wood and form successive inclined planes. The elevated end
of the second table and of each succeeding one, is placed about three inches below
the lowest end of the table above it and removed forward so as to leave an aperture
of about twelve inches between the ends of the tables. The whole breadth thereof for the
imperfect shot to drop through. immediately under the aperture is placed a receiving
box furnished with a bottom inclined from one end to the other, or from an elevated
centre towards both ends. The imperfect shot falling into that receiver glides off into
a case or cases that conducts it to an open box placed to receive it at the bottom of
the frame. At the lower end of each table is a sliding inclined plane sufficiently
wide to admit of its nearly closing up the aperture between the ends of the tables
and so that it may work upon the surface at the elevated end of the next table
which sliding inclined plane by means of its casings or sides and light strips of frame
work. clasping the tables sufficiently close to render them stationary in the requisite
position. but so as to admit of their being moved backwards and forwards by a small
force of the hands determines the aperture through which the imperfect shot drops

[illegible] the ends of the tables the whole breadth thereof according to the nature of the shot
as to size and imperfections. At [illegible] end of the frame and immediately above the elevated
end of the first table is a hopper [illegible] secured into which the shot is thrown from the
polishing barrel and passes on to two oblong metallic pans. The first fastened by a
hinge or joint to the hopper directly under the aperture in the lowest extremity of
the hopper. Both of which pans are also inclined planes in reverse order and are
connected together by means of a joint hinge or axle at one end so that the pan
is immediately above the other. The pan nearest the hopper having an aperture
not exceeding one inch in diameter near the end where it is connected with the
other pan. through which the shot falls into the lower pan and from it glides to
the table. The use of these pans is to regulate and guide the precipitation of the shot
from the hopper to the first table which is effected by increasing or decreasing the in-
clination of the pans by means of a cord attached to one end. and passing over one
end of the frame. The shot being admitted from the hopper to the tables as before
mentioned glide and roll down the first table to the end thereof where a portion
of the most imperfect shot is detected and fall into the first receiver through the
aperture between the end of the first table and the sliding inclined plane. The
perfect and remaining less imperfect shot by reason of their greater velocity hav-
ing cleared the aperture are conducted by the sliding inclined plane to the next table. and con
tinue their course from the first to the last table undergoing at the end of each in like man-
ner another separation from the remaining imperfections until at the end of the last
table the entirely perfect shot precipitates itself into a receiving box placed in a direc
tion with the end of the table. A portion of perfect and a portion of imperfect shot min-
gled together (the former having imparted a part of its velocity to the latter by their coming
in contact) and the remaining part of the imperfect shot fall respectively upon two
sliding inclined planes placed in reversed order to the inclination of the table and
between the end of the table and the box which receives the perfect shot. and so framed
that the elevated edge of the first is about two and a half inches below the end of the table.
and the elevated edge of the second about the same distance below that of the first, and
so as to be moved closer or more apart from each other and from the end of the table that
the apertures between each of the whole breadth of the table may be determined ac-
cording to the size of the largest quantity of shot about to be screened, and by them
are conducted into their respective receivers placed under the table. Thus the perfect shot, the portions of perfect and imperfect shot mingled together and the entirely imper-
fect shot by their different velocities are entirely distributed and separated.
For the saving of room the tables may be placed in reversed order with a table or
tables above and below. in which case the elevated ends of the [illegible] tables must extend
sufficiently beyond and below the depressed end of the table above it, so as
to admit the box or receiver with the inclined bottom (intended to carry off the imper-
fect shot immediately under the aperture between the end of the table and its sliding
inclined plane, and so as to leave sufficient room between the receiver and the sur-
face of the table below it and between the head or elevated end of that table and the
depressed edge of the sliding inclined plane for the shot which has cleared the aper-
ture to find a free passage. The inclination of the plane of each table is decreased
from the first (which is elevated about two and one fourth inches to each foot in length
of the table from a horizontal line) to the last each table after the first decreas-
ing according to the number of tables in about the proportion of three fourths of an
inch to each foot. until the inclination of the last is reduced to not less than half
an inch per foot. the others in relative proportions. The whole machine is con-
structed and depends upon the principle of gravitation acting upon an inclined
plane; and upon the difference of velocity between gravitating bodies of a greater or
less globular form. The utility of the invention consists in its saving power the
shot carrying itself from the hopper to a perfect disengaged state from all im-
perfections without manual assistance except that which is required to remove
the portions of perfect and imperfect shot mingled together, from its receiver at the
foot of the tables, to the hopper where it is again thrown in with other shot from
the polishing barrel. The whole machine is of wood except the necessary nails
and screws to keep it together and the regulating pins. [illegible]

Witnesses
William Elliot
Wm. P. Elliot

[illegible] M. Kenney

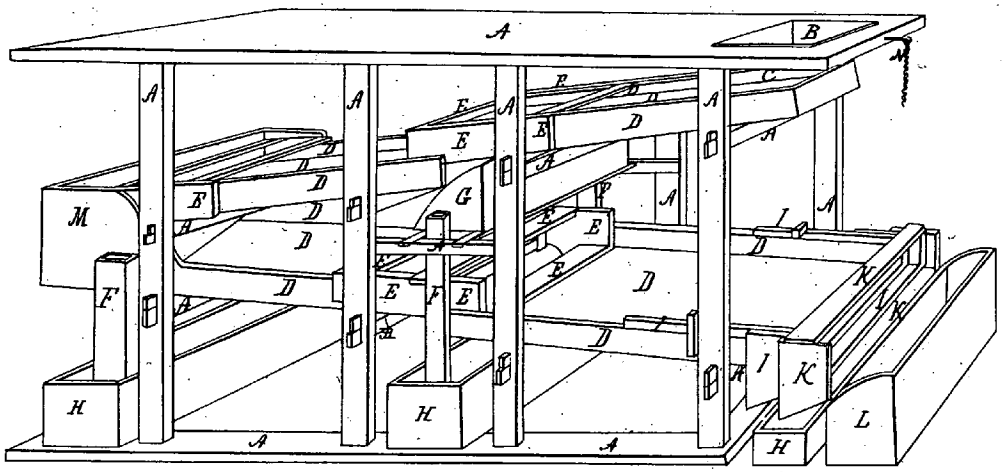

United States Patent
Patent No.: X4024
*NO PRINTED SPECIFICATION AVAILABLE*
4024X
*J. W. Honey.*
*Shot Screen.*
*Patented Feb. 10, 1885.*